United States Patent [19]

Cherukuri et al.

[11] Patent Number: 5,009,893
[45] Date of Patent: Apr. 23, 1991

[54] BREATH-FRESHENING EDIBLE COMPOSITIONS OF METHOL AND A CARBOXAMIDE

[75] Inventors: Subraman R. Cherukuri, Towaco; Krishna Raman, Randolph, both of N.J.; Gul Mansukhani, Staten Island, N.Y.; Ralph Cifrese, Wharton, N.J.; Lucy L. Wong, Jackson Heights, N.Y.

[73] Assignee: Warner-Lambert Company, Morris Plains, N.J.

[21] Appl. No.: 381,218

[22] Filed: Jul. 17, 1989

[51] Int. Cl.$^5$ .............. A61K 7/16; A61K 9/68
[52] U.S. Cl. .................. 424/440; 424/48; 424/49; 424/441
[58] Field of Search ............ 424/440, 48, 49, 441

[56] References Cited

U.S. PATENT DOCUMENTS

| | | | |
|---|---|---|---|
| 2,525,072 | 10/1950 | Kearby | 167/93 |
| 2,922,747 | 1/1960 | Scanlan | 167/93 |
| 3,554,767 | 1/1971 | Daum | 424/440 X |
| 4,029,759 | 6/1977 | Humbert | 424/49 |
| 4,060,091 | 11/1977 | Watson et al. | 131/9 |
| 4,112,066 | 9/1978 | Hussein | 424/48 |
| 4,136,163 | 1/1979 | Watson et al. | 424/34 |
| 4,724,151 | 2/1988 | Mansukhani et al. | 426/3 |
| 4,853,212 | 8/1989 | Faust | 424/48 X |

FOREIGN PATENT DOCUMENTS

| | | |
|---|---|---|
| 989738 | 5/1976 | Canada . |
| 2127005 | 1/1972 | France . |
| 1351761 | 5/1974 | United Kingdom . |

Primary Examiner—Thurman K. Page
Attorney, Agent, or Firm—Daniel A. Scola, Jr.

[57] ABSTRACT

An edible composition capable of providing long-lasting, breath freshening perception without bitterness which comprises using in said edible composition a cooling composition comprising methanol and an N-substituted-p-methane carboxamide compound.

30 Claims, 3 Drawing Sheets

FIG-2

BREATH-FRESHENING EDIBLE COMPOSITIONS OF METHOL AND A CARBOXAMIDE

BACKGROUND OF THE INVENTION

1. Field of the Invention

This invention relates to edible compositions having a unique, long-lasting, cooling perception which provides the user with a significantly enhanced perception of breath-freshening without bitterness and more particularly to chewing gum compositions and confectionery compositions which provide a long-lasting, breath freshening perception without bitterness.

2. Description of Related Art

It is well recognized that one of the purposes of chewing gum and confectionery products is to enhance one,s breath and provide a clean, cool, fresh feeling in the mouth. Most products can provide at least marginal enhancement of the breath for the first few minutes while the flavor is the most intense, but lack the ability to maintain such perception for long periods of time, that is times up to about 30 minutes.

Chewing gums in particular have not been able to deliver to the user sufficient flavor such that there is a perceived breath-freshening effect which is sustained over a long period of time. In some instances, the incorporation of greater than normal amounts of mint flavor have been attempted to induce the breath-freshening effect, but harsh and bitter tones often result. Such bitterness has been attributed to the presence of menthol when either used alone or when present in the flavor oil. Harsh tones, of course, are unacceptable to the consumer, who requires an organoleptically pleasing taste. Larger amounts of flavor are also a disadvantage in that the oils tend to plasticize the gum base, thereby altering the texture and consistency of the chewing gum product. In non-stick chewing gum compositions, flavor plasticization of the gum base can defeat the non-stick character, rendering the gum unacceptable to denture and prosthesis wearers. For these reasons, the simple addition of higher levels of mint flavor will not provide a satisfactory chewing gum having enhanced breath-freshening.

Numerous patents have discussed the combination of flavor oils and flavor powders to increase flavor impact and extend the taste over a prolonged period of time. Such techniques as encapsulation of flavors and sweeteners to provide time release are commonly used to achieve prolonged effects and sequential delivery of the flavor or sweetener.

The patents which do address the concept of breath-freshening often focus on the incorporation of an additive which serves as a deodorizer. For example, U.S. Pat. No. 2,525,072 discloses chewing gums containing inorganic silicone and magnesium powders which serve as absorbents of malodor. U.S. Pat. No. 2,922,747 discloses the use of chlorophyll, vegetable oils (lipids) and lecithin as effective deodorants in tablets and chewing gum compositions.

Canadian Pat. No. 989,738 discloses a wafer containing cetylidimethylbenzylammonium chloride and peppermint oil as a means for providing residual breath-sweetening in the mouth. In contrast U.S. Pat. No. 4,112,066 discloses breath-freshening compositions containing calcium and magnesium carbonate in combination with copper gluconate in a mint flavored tablet. Whereas French Demande 2,127,005 discloses reodorizing compositions containing 10-2000 ppm alpha-ionone, alpha-methylionone, citral or geranyl formate as a means of masking odors.

Besides these approaches, U.S. Pat. No. 4,724,151 entitled "Chewing Gum Compositions Having Prolonged Breath-Freshening", concerns a mint flavored chewing gum composition capable of providing improved breath-freshening perception comprising a blend of 1) a liquid flavor oil selected from the group consisting of spearmint oil, peppermint oil and mixtures thereof, wherein the flavor oil has a menthol content of about 27% to about 36% by weight of said flavor oil; 2) a spray-dried flavor oil selected from the group consisting of peppermint oil and spearmint oil and mixtures thereof; and 3) spray-dried menthol present in amounts of about 0.2 to about 0.75% by weight of the chewing gum composition. This invention focused on mint-flavored gums and confectionery, i.e., peppermint, spearmint and combinations thereof, because of their association with the cooling sensation in the mouth and their ability to be combined with menthol to produce a sustained cooling sensation and fresh impact.

In addition to these procedures, U.S. Pat. No. 4,136,163 discloses the formation of a compound having the property of stimulating the cold receptors of the nervous system to produce cold sensations which compounds are disclosed for use in a variety of edible and topical preparations. The compounds disclosed are N-substituted-p-menthane-3-carboxamides which are the same compounds used by Applicants in the present invention.

SUMMARY OF THE INVENTION

Applicants have unexpectedly found that N-substituted-p-menthane carboxamides when used in combination with menthol in specific amounts results in an unexpected heightened cooling sensation in edible products. The use of either of these products alone or outside the disclosed ranges fail to result in the cooling effect achieved herein.

In accordance with a preferred embodiment of the present invention, a chewing gum composition which is capable of providing long-lasting, breath freshening perception without bitterness comprises a gum base, a sweetener and a cooling composition comprising menthol and an N-substituted-p-menthane carboxamide of the formula:

wherein, $R_1$ when taken separately is selected from the group consisting of hydrogen and an aliphatic radical containing up to 25 carbon atoms;

$R_2$, when taken separately is selected from the group consisting of hydroxy radical, and an aliphatic radical containing up to 25 carbon atoms, with the proviso that when $R_1$ is hydrogen $R_2$ may also be an aryl radical of up to 10 carbon atoms and selected from substituted phenyl, phenalkyl, naphthyl and substituted naphthyl, and pyridyl; and $R_1$ and $R_2$ when taken together, represent a cyclic or heterocyclic group of up to 25 carbon atoms.

Another preferred embodiment of the present invention is a confectionery composition which is capable of providing long-lasting, breath freshening perception without bitterness comprising a confectionery matrix and a cooling composition comprising menthol and an N-substituted-p-methane carboxamide of the formula:

wherein $R_1$ when taken separately is selected group consisting of hydrogen and an aliphatic radical containing up to 25 carbon atoms;

$R_2$ when taken separately is selected from the group consisting of hydroxy radical, and an aliphatic radical containing up to 25 carbon atoms, with the proviso that when $R_1$ is hydrogen $R_2$ may also be an aryl radical of up to 10 carbon atoms and selected from substituted phenyl, phenalkyl, naphthyl and substituted naphthyl, and pyridyl; and $R_1$ and $R_2$ when taken together, represent a cyclic or heterocyclic group of up to 25 carbon atoms.

Another embodiment involves a process of preparing a chewing gum composition capable of imparting breath freshening perception which comprises admixing a chewing gum base at a temperature of about 70° C. to about 120° C. with a softener to obtain a homogenous pliable mixture; continuing to mix while adding a sweetening agent; adding menthol and a N-substituted-p-menthane carboxamide compound and the remaining chewing gum ingredients and mixing until a uniform mass is obtained; and thereafter forming the mixture into suitable shapes.

Another embodiment involves a process for preparing a confectionery composition capable of imparting breath freshening perception which comprises (a) preparing a soft confectionery matrix; (b) adding menthol and a N-substituted-p-menthane xarboxamide compound to the matrix, and mixing until a uniform mass is obtained; and (c) thereafter forming the mixture into suitable confectionery shapes.

DESCRIPTION OF THE PREFERRED EMBODIMENTS

It has been unexpectedly discovered that the use of a particular cooling compound in combination with menthol results in the formation of an edible product which exhibits a high initial cooling perception as well as long-lasting, breath-freshing for times as long as 30 minutes. This combination of ingredients may be used in both sugared and sugarless products to achieve this heightened perception.

While the precise reason why these agents give an enhanced breath-freshening effect is not entirely understood, it is known that each component plays a vital role. The presence of only one of these components will not provide the desired results and as such are not considered part of this invention. Menthol, when used alone, has an initial high flavor impact, but its impact drops sharply within a few minutes after use. In addition, it tends to distort flavor notes and render the product bitter when not used in precise amounts. In contrast, N-substituted-p-menthane carboxamides disclosed in U.S. Pat. No. 4,136,163 fail to exhibit any initial cooling perception.

A combination of these two ingredients when used in specific amounts overcomes the deficiencies of each component. The cooling composition of the present invention contains menthol in amounts of about 5 to about 70% by weight and preferably in amounts of about 20 to about 60% by weight of the cooling composition. The N-substituted-p-menthane carboxamide compound is used in amounts of about 30 to about 95% by weight and preferably in amounts of about 40 to about 80% by weight of the cooling composition. It is critical that the amount of the N-substituted-p-menthane carboxamide compound not be below 30% by weight of the combination, since such low amounts fail to form products that exhibit long-lasting cooling which are not bitter. In contrast, amounts above about 95% fail to form products that exhibit an initial cooling effect.

The cooling composition is used in the formulations of the invention in amounts from about 0.01 to about 2.0% by weight of the total formulation and preferably in amounts of about 0.1 to about 0.5% by weight of the total formulation.

The N-substituted-p-menthane-carboxamides used in the invention are those that fall within the formula:

wherein $R_1$ when taken separately is selected from the group consisting of hydrogen and an aliphatic radical containing up to 25 carbon atoms;

$R_2$ when taken separately is selected from the group consisting of a hydroxy radical, an aliphatic radical containing up to 25 carbon atoms, with the proviso that when $R_1$ is hydrogen $R_2$ may also be an aryl radical of up to 10 carbon atoms and selected from substituted phenyl, phenalkyl, naphthyl and substituted naphthyl, and pyridyl; and $R_1$ and $R_2$ when taken together, represent a cyclic or heterocyclic group of up to 25 carbon atoms. These compounds are recited in U.S. Pat. No. 4,136,163, which disclosure is incorporated by reference herein.

A preferred species is N-ethyl-p-menthane-3-carboxamide. It should be noted that these compounds are quite similar structurally to menthol itself.

While the carboxamide compounds are generally insoluble in water, they may be employed in the edible formulations as particulate solids and added directly to the formulations or blended with other solid ingredients used to make the compositions. It is contemplated that this component may be added in several forms, such as in the form of an encapsulate, or previously dissolved in a polar solvent and/or mixed with a flavor oil and then used in the inventive formulation. Encapsulation may be achieved using conventional procedures which do not constitute a part of this invention. The encapsulation may be performed using water-insoluble as well as water-soluble agents. This procedure is beneficial when a delay in cooling perception is desired. When the carboxamides are dissolved in a polar solvent such solvents may be selected from a wide variety of materials. Preferred solvents are selected from the group consisting of ethyl alcohol, ethylacetate, diethyl ether, isopropyl alcohol and glycerin which have dipole moments in Debyes of 1.69, 1.78, 1.15, 1.66 and 2.56 respectively. The use of a solvent is particularly preferred when preparing confectionery products in order to obtain a uniform mixture of the compound into the confectionery matrix. In chewing gums which employ glycerin, the compound may be simply preblended in the glycerin and added simultaneously therewith to the product. The same is also effective when premixed in the flavor oil. Such premixtures aid in enhancing uniform distribution in the product and efficient release during use.

Chewing gum formulations in which the novel flavor compositions may be employed, will vary greatly depending on various factors such as the type of base used, consistency desired and other components used to make the final product. In general, useful amounts of gum base vary from about 5% to about 75% by weight of the final chewing gum composition, with preferred amounts being about 15% to about 30% by weight and most preferably about 15% to about 25%. The gum base may be any water-insoluble gum base well known in the art, providing it allows for adequate release of the two components such that breath-freshening is perceived. Illustrative examples of suitable polymers in gum bases include both natural and synthetic elatomers and rubbers. For example, those polymers which are suitable in gum bases, include, without limitation, substances of vegetable origin such as chicle, jelutong, gutta, percha, and crown gum. Synthetic elastomers such as butadiene-styrene copolymers, isobutylene-isoprene copolymers, polyethylene, polyisobutylene and polyvinyl-acetate and mixtures thereof, are particularly useful.

The instant invention is especially useful in gum bases which can be formulated into sugar and sugarless chewing gum and bubble gum compositions.

The gum base composition may contain elastomer solvents to aid in softening the rubber component. Such elastomer solvents may comprise methyl, glycerol or pentaerythritol esters of rosins or modified rosins, such as hydrogenated, dimerized or polymerized rosins or mixtures thereof. Examples of elastomer solvents suitable for use herein include the pentaerythritol ester of partially hydrogenated wood rosin and partially hydrogenated wood rosin, pentaerythritol ester of wood rosin, glycerol ester of wood rosin, glycerol ester of partially dimerized rosin, glycerol ester of polymerized rosin, glycerol ester of tall oil rosin, glycerol ester of wood rosin and partially hydrogenated wood rosin and the partially hydrogenated methyl ester of rosin, such as polymers of alpha-pinene or beta-pinene, terpene resins including polyterpene and mixtures thereof. The solvent may be employed in an amount ranging from about 10% to about 75% and preferably about 45% to about 70% by weight to the gum base.

A variety of traditional ingredients such as plasticizers or softeners such as lanolin, stearic acid, sodium stearate, potassium stearate, glyceryl triacetate, glycerine and the like, and waxes, for example, natural waxes, petroleum waxes such as polyurethene waxes, paraffin waxes and microcrystalline waxes may also be incorporated into the gum base to obtain a variety of desirable textures and consistency properties. These individual additional materials are generally employed in amounts of up to about 30% by weight and preferably in amounts of from about 3% to about 20% by weight of the final chewing gum composition.

The chewing gum composition may also include conventional additives such as flavoring agents; coloring agents such as titanium dioxide; emulsifiers such as lecithin and glyceryl monostearate; and additional fillers such as aluminum hydroxide, alumina, aluminum silicates, calcium carbonate, and talc. Combinations of these conventional additives are contemplated. These fillers may also be used in the gum base in various amounts. Preferably the amount of fillers when used will vary from about 4% to abut 45% by weight of the final chewing gum composition.

The present invention contemplates the inclusion of those sweeteners well known in the art, including both natural and artificial sweeteners. Thus, sweeteners may be chosen from the following non-limiting list; sugars such as sucrose, glucose (corn syrup), dextrose, invert sugar, fructose, and mixtures thereof; saccharin and its various salts such as the sodium or calcium salt; cyclamic acid and its various salts such as the sodium or calcium salt; cyclamic acid and its various salts such as the sodium salt (cyclamates); the dipeptide sweeteners such as aspartame and Alitame; chlorinated sugar derivatives such as Sucralose; natural sweeteners such as dihydrochalcone; glycyrrhizin; Stevia rebaudiana (Stevioside); and sugar alcohols such as sorbitol, sorbitol syrup, mannitol, xylitol, and the like. Also contemplated as a sweetener is the nonfermentable sugar substitute hydrogenated starch hydrolysate (lycasin) which is described in U.S. Pat. No. Re. 26,959. Also contemplated is the synthetic sweetener 3,6-dihydro-6-methyl-1-1,2,3-oxathiazin-4-one-2, 2-dioxide particularly the potassium (Acesulfame-K), sodium and calcium salts thereof as described in German Pat. No. 2,001,017.7.

The colorants useful in the present invention, include the pigments such as titanium dioxide, and are incorporated in amounts of up to about 10% by weight, and preferably up to about 6% by weight. Colorants may also include dyes suitable for food, drug and cosmeic applications. These colorants are known as F.D. & C. dyes. The materials acceptable for the foregoing spectrum of use are preferably water-soluble. Illustrative examples include indigo dye, known as F.D. & C. Blue No. 2, which is the disodium salt of 5,5'-indigotin-disulfonic acid. Similarly, the dye known as F.D. & C. Green No. 1, comprises a triphenylmethane dye and is F.D.&C. and D.&C. colorants and their corresponding chemical structures may be found in the Kirk-Othmer Encyclopedia of Chemical Technology, in Volume 5, at pages 857-884.

The cooling composition of the instant invention may also be used in conventional soft and hard confections.

The preparation of soft confections, such as nougat, involves conventional methods, such as the combination of two primary components, namely (1) a high boiling syrup such as corn syrup or the like and (2) a relatively light textured frappe, generally prepared from gelatin, egg albumen, milk proteins such as casein, and vegetable proteins such as soy protein, and the like. The frappe is generally relatively light, and may, for example, range in density from about 0.5 to 0.7.

The high boiled syrup of the soft confectionery is relatively viscous and possesses a higher density and frequently contains a substantial amount of sugar. Conventionally, the final nougat composition is prepared by the addition of a high boiled syrup to the frappe under agitation, to form the basic nougat mixture. Further ingredients such as flavoring, additional sugar, colorants, preservatives, medicaments, mixtures thereof and the like may be added thereafter also under agitation. General discussion of the composition and preparation of nougat confections may be found in B.W. Minifie, Chocolate, Cocoa and Confectionery Science and Technology, 2nd edition, AVI Publishing Co., Inc., Westport, CT. (1980), at pages 424–425.

The procedure for preparing the "soft" confectionery involves known procedures. In general, the frappe component is prepared first and thereafter the syrup component is slowly added under agitation at a temperature of at least 65° C., and preferably at least 100°. The mixing of components is continued to form a uniform mixture, after which the mixture is cooled to a temperature below 80° C., at which point the flavor may be added. The mixture is further mixed for an additional period until it is ready to be removed and formed into suitable confectionery shapes.

Similar to the soft confectionery, hard confectionery may be utilized in this invention. Likewise, it may be processed and formulated by conventional means. In general, a hard confectionery has a base composed of a mixture of cane or beet sugar, polyhydric alcohols and glucose syrup, which are present in the final confectionery in amounts of between about 5% and about 99% by weight of the final composition and low moisture levels, e.g., from 0.5 to 1.5%. Such confectionery may be routinely prepared by conventional methods, such as those involving fire cookers, vacuum cookers and scraped-surface cookers also referred to as high speed atmospheric cookers.

Fire cookers involving the traditional method of making candy base, may be used. In this method the desired quantity of sugar is dissolved in water by heating in a kettle until the sugar dissolves. Corn syrup or an invert sugar is then added and cooking continued until a final temperature of 145° to 165° C. is achieved. The batch is then cooled and worked as a plastic-like mass to incorporate additives.

A high-speed atmospheric cooker uses a heat-exchange surface. Processes using it involve spreading a film of candy on a heat exchange surface, and heating the candy to 165° to 170° C. in a few minutes. The candy is then rapidly cooked to 100° to 120° C. and worked as a plastic-like mass enabling incorporation of the additives, such as flavor, color, acidulents and medicaments. It is at this point that the inventive cooling compositions may be blended into the candy.

In vacuum cookers, the sugar and corn syrup are boiled to 125° to 132° C., vacuum applied, and additional water is boiled off without extra heating. When cooking is complete, the mass is a semi-solid, having a plastic-like consistency. At this point, color, flavors the cooling composition and additives are mixed in the mass by routine mechanical mixing operations.

The optimum mixing required to uniformly mix the flavor, color, cooling composition and other additives during conventional manufacturing of hard confectionery is determined by the time needed to obtain a uniform distribution of the materials. Normally, mixing times of 4 to 10 minutes have been found acceptable.

Once the candy mass has been properly tempered, it may be cut into workable portions or formed into desired shapes. A general discussion of the composition and the preparation of hard confections may be found in H.A. Lieberman, Pharmaceutical Dosage Forms: Tablets Vol 1 (1980), Marcel Dekker, Inc. at pages 339 to 469.

It should be mentioned that the apparatus useful in accordance with the present invention comprises those cooking and mixing apparatus well known in the confectionery manufacturing arts, and therefore, the selection of a specific apparatus will be apparent to the ordinary artisan.

The confectioneries useful in conjunction with the cooling composition of this invention include, but are not limited to, sugarless boiled candy, lozenges, pressed tablets, toffee and nougat, gels, mints, syrups, liquids, elixirs and the like.

The N-substituted-p-menthane carboxamide compound may be added at anytime during the preparation of the chewing gum or confectionery, since this material will not volatize under standard processing temperatures. In contrast, menthol must be added at temperatures below its volatility point. Accordingly, these materials may be added separately to the mass being made or jointly at different times. When used together a temperature suitable to prevent the volatization of the menthol component may be easily determined without any undue experimentation.

The present invention includes, a preferred process for preparing a confectionery composition capable of imparting breath freshening perception. The process involves preparing a soft confectionery matrix containing the components discussed above, adding menthol at a temperature below its volatility point and the N-substituted p-menthane carboxamide compound to the matrix and mixing until a uniform mass is obtained, and thereafter forming the mixture into suitable confectionery shapes.

The present invention also includes a preferred method for preparing a chewing gum composition, including both chewing gum and bubble gum formulations. The gum base is conventionally melted at temperatures that may range from about 60° to about 120° C. for a period of time sufficient to render the base molten. For example, the gum base may be heated under these conditions for a period of about thirty minutes just prior to mixing with the remaining ingredients of the gum composition. The order of addition of the remaining ingredients is not critical. A preferred procedure involves mixing the gum base with the softener until a uniform homogenous mass is obtained, then a portion of the sweetening agent (normally one-half) is added to the heated gum base, and blending is continued until a homogenous mass is prepared, preferably up to five minutes. Finally, the remaining sweetener and flavor oil are added, and again, blended to form a uniform composition. As one embodiment, the mixture is allowed to remain hot, and the cooling composition is added along with the remainder of the ingredients, including the colorant, if any, and other adjuvants, and the resulting composition is then mixed for a period of time that may range as high as thirty minutes, to form a fully uniform composition. The mass is then removed from the mixer and is allowed to cool further and may thereafter be formed into various final shapes by known gum manufacturing techniques. For example, the mass may be rolled in contact with a conventional dusting medium, such as calcium carbonate, mannitol, talc and others.

The gum composition of the present invention may be prepared into all the various end forms known commercially, including slab form, stick form, cube form and center-filled form. Sugar and sugarless chewing gums are contemplated within the scope of this invention. All of the techniques associated with the preparation of the products in these forms are well known and the present method may vary somewhat depending upon the specific end product to be manufactured.

The following examples serve to provide further appreciation of the invention but are not meant in any way to restrict the effective scope of the invention. All percentages throughout the specification are by weight % of the final chewing gum composition unless otherwise indicated and wherein all percentages will total 100% of ingredients in the final composition.

EXAMPLE 1

Chewing gum compositions were prepared using the formulations set forth in Tables I, II, and III. The formulations were prepared by melting the gum base at a temperature of about 85 to 90° C. and then adding with mixing the lecithin followed by adding the corn syrup and ⅔ of the sugar and again mixing until a homogenous mixture was obtained, approximately 5 minutes total time. The flavor and glycerin were then added and mixed for about 2 minutes each followed by the remaining sugar which was mixed until a homogenous mixture was obtained, about 2 minutes. The formulation was cooled to about 40 to 45° C. and the menthol and carboxamide compound added and mixed into the formulation. The formulations were then cut into slab shapes.

Figure 1:
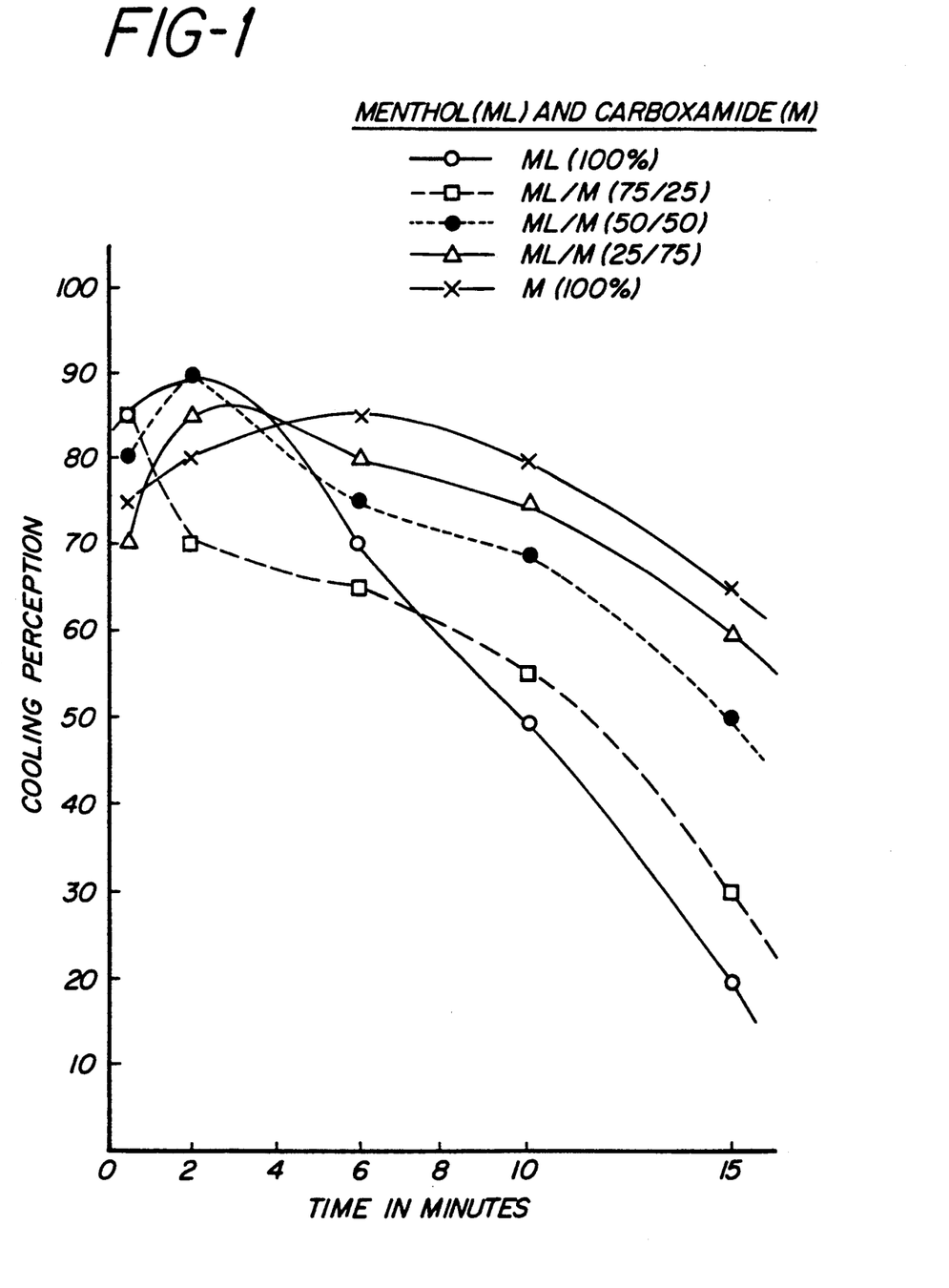
FIG. 1 graphically depicts the breath-freshening perception achieved from the sensory evaluation studies of Example 1 formulations.

These formulations were subjected to sensory evaluation studies to assess the perceived breath-freshening of the inventive compositions as compared to formulations containing only one of the cooling compounds. The results are recited in Tables I, II and III which results from Table 1 are also graphically depicted in FIG. 1. As is shown in FIG. 1, only compositions containing the cooling compositions of this invention achieve up-front and long-lasting cooling and breath freshening efforts.

TABLE I

| | COMPOSITIONS % by Weight | | | | |
|---|---|---|---|---|---|
| | Comparative | | Inventive | Inventive | Comparative |
| Ingredient | A | B | 1 | 2 | C |
| Gum Base | 21.00 | 21.00 | 21.00 | 21.00 | 21.00 |
| Corn Syrup 44° BE | 16.50 | 16.50 | 16.50 | 16.50 | 16.50 |
| Sugar 6x | 60.60 | 60.60 | 60.60 | 60.60 | 60.60 |
| Lecithin | 0.20 | 0.20 | 0.20 | 0.20 | 0.20 |
| Peppermint Flavor Oil Blend | 1.1438 | 1.1438 | 1.1438 | 1.1438 | 1.1438 |
| Glycerin | 0.45 | 0.45 | 0.45 | 0.45 | 0.45 |
| Menthol | 0.1062 | 0.07965 | 0.0531 | 0.02655 | — |
| N-ethyl-p-menthane-3-carboxamide | — | 0.02655 | 0.0531 | 0.07965 | 0.1062 |
| Comments: | (a) high upfront cooling (b) cooling dropped after 2 minutes & bitterness developed | (a) high upfront cooling (b) cooling dropped after 2 minutes & bitterness developed | (a) high upfront cooling (b) cooling maintained for at least 15 to 30 minutes (c) no bitterness | (a) high upfront cooling (b) cooling maintained for at least 15 to 30 minutes (c) no bitterness | (a) no upfront cooling (b) cooling gradually developed after about 6 minutes |

TABLE II

| | COMPOSITIONS % BY WEIGHT | | | | | |
|---|---|---|---|---|---|---|
| | COMPARATIVE EXAMPLES | | | | | |
| Ingredient | D | E | F | G | H | I |
| Gum Base | 21.00 | 21.00 | 21.00 | 21.00 | 21.00 | 21.00 |
| Corn Syrup 44° BE | 16.50 | 16.50 | 16.50 | 16.50 | 16.50 | 16.50 |
| Sugar 6x | 60.7062 | 60.6062 | 60.5062 | 60.6062 | 60.5062 | 60.2062 |
| Lecithin | 0.20 | 0.20 | 0.20 | 0.20 | 0.20 | 0.20 |
| Peppermint Flavor Oil Blend | 1.1438 | 1.1438 | 1.1438 | 1.1438 | 1.1438 | 1.1438 |
| Glycerin | 0.45 | 0.45 | 0.45 | 0.45 | 0.45 | 0.45 |
| Menthol | — | 0.10 | 0.20 | — | — | — |
| N-ethyl-p-menthane-3-carboxamide | — | — | — | 0.10 | 0.20 | 0.50 |

TABLE II-continued

Comments:
(a) upfront sweetness but no cooling effect
(a) upfront cooling and sweetness
(b) after two minutes become bitter
(a) upfront cooling and sweetness
(b) after two minutes become bitter
(a) upfront sweetness with little cooling after about 6 minutes
(b) no harshness
(a) upfront sweetness with little cooling after about 6 minutes
(b) no harshness
(a) upfront sweetness with little cooling after about 6 minutes
(b) no harshness

TABLE III

COMPOSITIONS % BY WEIGHT

| Ingredients | Inventive 3 | Inventive 4 | Inventive 5 |
|---|---|---|---|
| Gum Base | 21.00 | 21.00 | 21.00 |
| Corn Syrup 44° BE | 16.00 | 16.00 | 16.00 |
| Sugar 6x | 61.20 | 61.27 | 61.342 |
| Spearmint flavor blend | 1.3415 | 1.3415 | 1.3415 |
| Glycerin | 0.30 | 0.30 | 0.30 |
| Color | 0.025 | 0.025 | 0.025 |
| N-ethyl-p-menthane-3-carboxamide(1) | 0.21675 | 0.1445 | 0.07225 |

Comments:
(a) cooling composition contained 75%(1) excellent upfront and long term cooling
(b) no bitterness
(a) cooling composition contained 50%(1) good upfront and long term cooling
(b) no bitterness
(a) cooling composition contained 25%(1) good upfront cooling but poor long term cooling,
(b) bitterness after 2 minutes

EXAMPLE 2

Chewing gum compositions were prepared using the formulations set forth in Table IV. The formulations were prepared by the procedure of Example 1.

Figure 2:
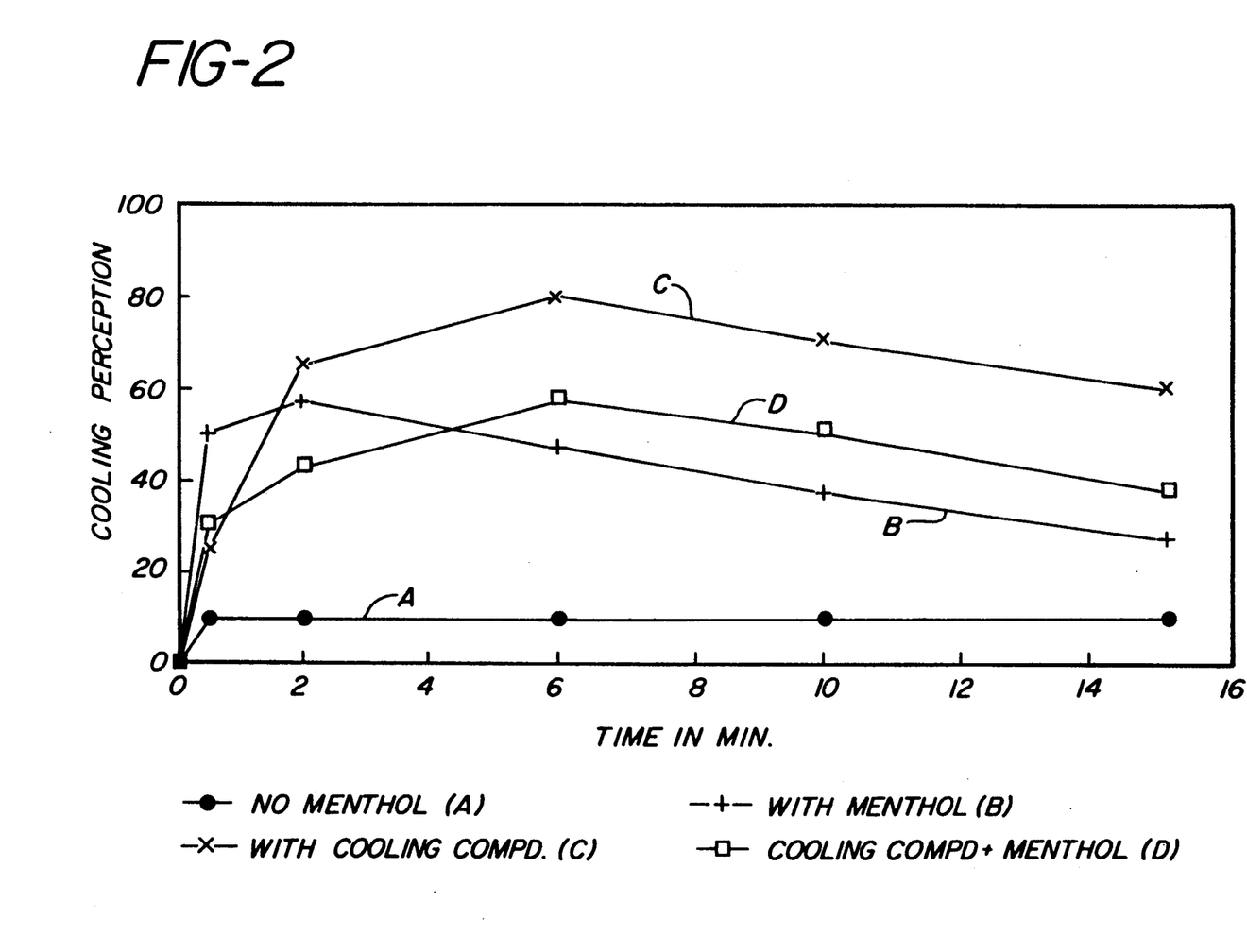
FIG. 2 graphically depicts the breath-freshening preception achieved from the sensory evaluation studies of Example 2 formulations.

In this example the carboxamide compounds were predissolved in ethanol as the polar solvent and then added to the chewing gum composition. The results are set forth in FIG. 2.

TABLE IV

COMPOSITIONS % BY WEIGHT

| Ingredient | COMPARATIVE J | K | L | INVENTIVE 6 |
|---|---|---|---|---|
| Gum Base | 21.00 | 21.00 | 21.00 | 21.00 |
| Carbohydrates | 77.336 | 77.047 | 77.047 | 77.047 |
| Softeners | 0.50 | 0.50 | 0.50 | 0.50 |
| Color | 0.025 | 0.025 | 0.025 | 0.025 |
| Spearmint Flavor | 0.85 | 0.85 | 0.85 | 0.85 |
| Menthol | — | 0.289 | — | 0.1445 |
| Cooling Compound (Example 1) | — | — | 0.289 | 0.1445 |
| Solvent (Absolute Alcohol) | 0.289 | 0.289 | 0.289 | 0.289 |

EXAMPLE 3

Confectionery compositions were prepared using the formulations set forth in Table V. The formulations were prepared by melting the candy base to a plastic mass, remelting the salvage, which is previously prepared candy, and mixing into the salvage the remaining components, and adding the salvage mix to the candy mass. Once homogenous, approximately 7 minutes, the mass passed through a forming apparatus and made into consumer size pieces.

Figure 3:
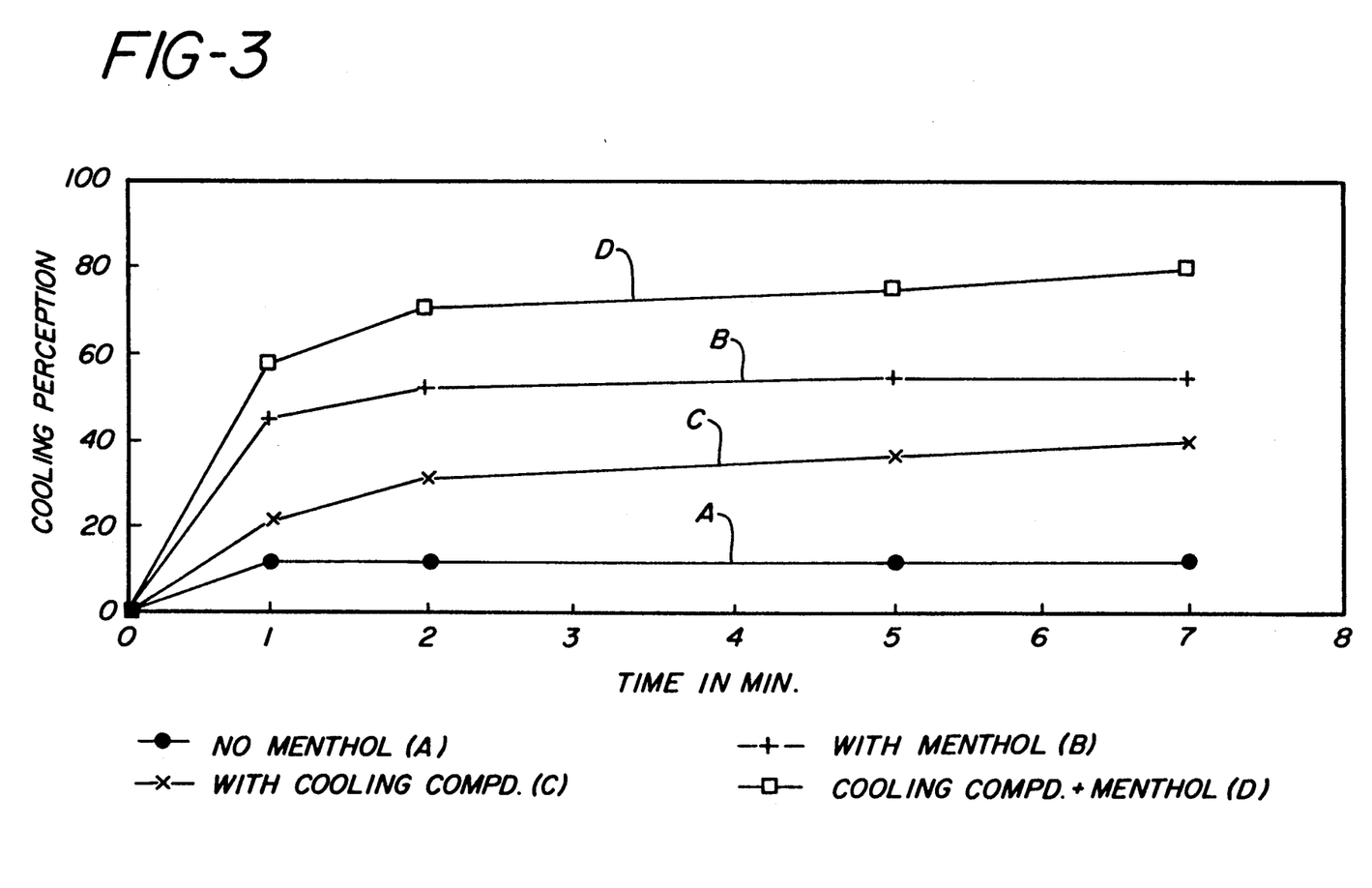
FIG. 3 graphically depicts the breath-freshening perception achieved from the sensory evaluation studies of Example 3 formulations.

The pieces were then subjected to sensory perception test according to Example 1. The results are set forth in FIG. 3.

TABLE V

| | 1 Grams | 2 Grams | 3 Grams | 4 Grams |
|---|---|---|---|---|
| *Candy Base | 53.103 | 52.603 | 53.093 | 52.593 |
| Cherry Flavor | 1.487 | 1.487 | 1.487 | 1.487 |
| Eucalyptus Oil | 0.400 | 0.400 | 0.400 | 0.400 |
| **Red Color Solution | 5.000 | 5.000 | 5.000 | 5.000 |
| Salvage | 40.000 | 40.000 | 40.000 | 40.000 |
| Alcohol | 0.010 | 0.010 | 0.010 | 0.100 |
| Menthol | — | 0.500 | — | 0.500 |
| Cooling Compound 2470 | — | — | 0.010 | 0.010 |
| | 100.000 | 100.000 | 100.000 | 100.000 |

*Candy Base
Sugar - 55% Solids
Corn Syrup - 45% Solids

**Red Color Solution 2% Solution
FD&C Red #40 - 93.0
FD&C Blue #2 - 7.0
         100.00

The invention being thus described, it will be obvious that the same may be varied in many ways. Such variations are not to be regarded as a departure from the spirit and scope of the invention and all such modifications are intended to be included within the scope of the following claims.

We claim:

1. A chewing gum composition capable of providing long-lasting, breath freshening perception without bitterness comprising a gum base, a sweetener and a cooling composition comprising menthol and an N-substituted-p-menthane carboxamide of the formula:

wherein $R_1$, when taken separately, is selected from the group consisting of hydrogen, and an aliphatic radical containing up to 25 carbon atoms;

$R_2$, when taken separately is selected from the group consisting of a hydroxy radical, and an aliphatic radical containing up to 25 carbon atoms, with the proviso that when $R_1$ is hydrogen $R_2$ may also be an aryl radical of up to 10 carbon atoms and selected from substituted phenyl, phenalkyl, naphthyl and substituted naphthyl, and pyridyl; and R₁ and R₂ when taken together, represent a cyclic or heterocyclic group of up to 25 carbon atoms.

2. The chewing gum composition of claim 1 wherein the N-substituted-p-menthane carboxamide is N-ethyl-p-menthane-3-carboxamide.

3. The chewing gum composition of claim 1 wherein the methanol and N-substituted-p-menthane carboxamide are used in amounts of about 30 to about 95% by weight N-substituted p-menthane carboxamide and about 5 to about 7% by weight methanol, all weights being by weight of the cooling composition.

4. The chewing gum composition of claim 3 wherein the menthol is used in amounts of about 20 to about 60% by weight of the cooling composition.

5. The chewing gum composition of claim 3 wherein the N-substituted-p-menthane carboxamide is used in amounts of about 40 to about 80% by weight of the cooling compositions.

6. The chewing gum composition of claim 1 wherein the cooling composition is present in the chewing gum composition in the amount of about 0.01 to about 2% by weight of the total chewing gum composition.

7. The chewing gum composition of claim 1 wherein the gum base is selected from the group consisting of natural or synthetic elastomers.

8. The chewing gum composition of claim 1 wherein the sweetener is a natural or synthetic compound.

9. The chewing gum composition of claim 1 containing one or more of the additional components selected from the group consisting of fillers, plasticizers, softeners, coloring agents, flavors, and mixtures thereof.

10. The chewing gum composition of claim 1 wherein the sweetener is selected from the group consisting of water-soluble sweetening agents, water-soluble artificial sweeteners, dipeptide based sweeteners and mixtures thereof.

11. The chewing gum composition of claim 1 wherein the sweetener is selected from the group consisting of liquid sweeteners, particulate sweeteners and mixtures thereof.

12. A confectionery composition capable of providing long-lasting, breath freshening perception without bitterness comprising a confectionery matrix and a cooling composition comprising menthol and an N-substituted-p-menthane carboxamide of the formula:

wherein R₁ when taken separately, is selected from the group consisting of hydrogen, and an aliphatic radical containing up to 25 carbon atoms;

R₂, when taken separately is selected from the group consisting of a hydroxy radical, and an aliphatic radical containing up to 25 carbon atoms, with the proviso that when R₁ is hydrogen R₂ may also be an aryl radical of up to 10 carbon atoms and selected from substituted phenyl, phenalkyl, naphthyl and substituted naphthyl, and pyridyl; and R₁ and R₂ when taken together, represent a cyclic or heterocyclic group of up to 25 carbon atoms.

13. The confectionery composition of claim 12 wherein the N-substituted p-menthane carboxamide is N-ethyl-p-menthane-3-carboxamide.

14. The confectionery composition of claim 12 wherein the menthol and N-substituted-p-menthane carboxamide are used in amounts of about 30 to about 95% by weight N-substituted-p-menthane carboxamide and about 5 to about 70% by weight menthol, all weights being by weight of the cooling composition.

15. The confectionery composition of claim 14 wherein the menthol is used in amounts of about 20 to about 60% by weight of the cooling composition.

16. The confectionery composition of claim 14 wherein the N-substituted-p-menthane carboxamide is used in amounts of about 40 to about 80% by weight of the cooling compositions.

17. The confectionery composition of claim 12 wherein the cooling composition is present in the confectionery composition in an amount of about .01 to about 2% by weight of the total confectionery composition.

18. The confectionery composition of claim 12 wherein the composition additionally contains a sweetener which selected from the group consisting of water-soluble sweetening agents, water-soluble artificial sweeteners, dipeptide based sweeteners and mixtures thereof.

19. A process of preparing a chewing gum composition capable of imparting breath freshening perception which comprises:
 a) admixing a chewing gum base at a temperature of about 70° C. to about 120° C. with a softener to obtain a homogenous pliable mixture;
 b) continuing to mix while adding a sweetening agent;
 c) adding menthol and a N-substituted-p-menthane carboxamide compound and the remaining chewing gum ingredients and continue mixing until a uniform mass is obtained; and
 d) thereafter forming the mixture into suitable chewing gum shapes.

20. The process of claim 19 wherein the N-substituted-p-menthane carboxamide compound is added in the form of a particulate solid.

21. The process of claim 19 wherein the N-substituted-p-menthane carboxamide compound is dissolved in a polar solvent and then added to the mixture.

22. The process of claim 19 wherein the N-substituted-p-menthane carboxamide compound is mixed with a flavor oil and then added to the mixture.

23. The process of claim 19 wherein the N-substituted-p-menthane carboxamide compound is encapsulated and then added to the mixture.

24. The process of claim 19 wherein the menthol and N-substituted-p-menthane carboxamide compound is added separately and admixed in the chewing gum base.

25. A process for preparing a confectionery composition capable of imparting breath freshening perception which comprises:
 a) preparing a soft confectionery matrix;
 b) adding menthol and a N-substituted-p-menthane carboxamide compound to the matrix and mixing until a uniform mass is obtained; and
 c) thereafter forming the mixture into suitable confectionery shapes.

26. The process of claim 25 wherein the N-substituted-p-menthane carboxamide compound is added in the form of a particulate solid.

27. The process of claim 25 wherein the N-substituted-p-menthane carboxamide compound is dissolved in a polar solvent and then added to the mixture.

28. The process of claim 25 wherein the N-substituted-p-menthane carboxamide compound is mixed with a flavor oil and then added to the mixture.

29. The process of claim 25 wherein the N-substituted-p-menthane carboxamide compound is encapsulated and then added to the mixture.

30. The process of claim 25 wherein the menthol and N-substituted-p-menthane carboxamide compound is added separately and admixed in the confectionery matrix.

* * * * *